United States Patent Office — 3,236,803 — Patented Feb. 22, 1966

3,236,803
VINYL RESINS STABILIZED WITH AN ALKYLENE OXIDE AND THE REACTION PRODUCT OF AN ALIPHATIC DIOL AND A DIHYDROCARBYL PHENYLPHOSPHONITE
James S. F. Huhn and Francis J. Sheets, Charleston, W. Va., assignors to Union Carbide Corporation, a corporation of New York
No Drawing. Filed Oct. 29, 1962, Ser. No. 233,920
5 Claims. (Cl. 260—45.8)

This application is a continuation-in-part of copending application Serial No. 11,140, filed February 26, 1960, now U.S. Patent 3,061,583.

The present invention relates to stabilized vinyl resin compositions and to methods for their preparation. More particularly, the invention is concerned with the production of stabilized vinyl resin solutions which evidence improved resistance to discoloration when subjected to the action of heat.

Vinyl resins are in general well known to the art and find use in a number of diverse applications. Noteworthy among such uses is the role vinyl resins play in the manufacture of synthetic fibers. It is also well known that vinyl resins are sensitive to heat as manifested by discoloration. Thus, for example, in the production of synthetic fibers from vinyl resins, the resin is ordinarily dissolved in a suitable inert organic solvent by means of heat and thereafter maintained in solution at elevated temperatures for prolonged periods of time during which fiber spinning operations are conducted. As a consequence of these and other procedures involving the heating of a vinyl resin solution, the color of the solution has often been found to undergo a progressive yellowing or darkening. In turn, this discoloration has been found to engender an undesirable initial color in the fibers or other articles produced from the heated vinyl resin solution. It has therefore become customary to incorporate in vinyl resin solutions small amounts of stabilizing materials for the purpose of retarding or inhibiting the discoloration which would otherwise occur upon the application of heat.

Among the compounds heretofore employed as stabilizers for vinyl resin solutions are the polymeric organophosphonites produced by the reaction of a saturated aliphatic polyol containing from 2 to about 8 carbon atoms with a dihydrocarbyl phenylphosphonite of the formula

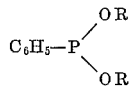

wherein each R, independently, designates either an alkyl radical containing from 1 to about 10 carbon atoms or a phenyl radical.

The incorporation of stabilizing quantities of such polymeric organophosphonites in vinyl resin solutions has been found to contribute appreciably to the minimization of discoloration in such solutions upon exposure to the action of heat and represents a significant improvement over the use of many other, conventional stabilizers. In large-scale commercial fiber-spinning operations, however, some variability in the stabilizing efficiency of the polymeric organophosphonites has been encountered. While the precise cause or causes of this variability is at present unknown, several conditions are believed to constitute underlying factors in this respect. One such condition is the exposure of the vinyl resin solution to high temperatures for considerable periods of time, thus taxing the stabilizing capacity of the polymeric organophosphonite. Another condition which may affect the efficiency of the polymeric organophosphonite as a stabilizer to some extent is the presence of water in the vinyl resin solution even in amounts as small as those commonly introduced as an impurity with the organic solvent for the resin. In this connection, by way of illustration, discoloration of the vinyl resin solution containing the polymeric organophosphonite has been found to progress somewhat more rapidly upon heating when water is also present therein. A third condition which may engender some variation in the effectiveness of the polymeric organophosphonite as a stabilizer for vinyl resin solutions is the exposure of the polymeric organophosphonite to moist air during storage precedent to its use as a stabilizer. Such storage has, for instance, often been found to reduce the efficiency of a given initial quantity of polymeric organophosphonite when subsequently employed as a stabilizer.

Unexpectedly, it has now been discovered that improved stabilizer compositions for use in conjunction with the stabilization of vinyl resin solutions are obtained by the addition to or incorporation with the polymeric organophosphonite of a lower alkylene oxide having a boiling point below 200° C. at atmospheric pressure. The alkylene oxide is preferably admixed with the polymeric organophosphonite as soon as possible after production of the latter and prior to any prolonged exposure of the polymeric organophosphnite to moisture. This mixture is subsequently incorporated in the vinyl resin solution in accordance with conventional stabilization techniques. In this manner, a maximum stabilizing effect can be achieved. However, improved results also accrue in accordance with this invention by the simultaneous or consecutive introduction of the polymeric organophosphonite and the alkylene oxide to the organic solvent employed either prior to, during, or subsequent to the dissolution of the vinyl resin in the organic solvent. Moreover, under such circumstances, the introduction of the stabilizer combination is preferably made prior to both the dissolution of the vinyl resin and any heating step.

Through the practice of this invention it is possible to prepare vinyl resin solutions which are nearly colorless initially and which demonstrate improved resistance to discoloration upon heating even for prolonged periods of time. The fibers produced from such stabilized resin solutions have a very high degree of whiteness and are, in turn, more suitable for use in the textile field. Moreover, due to the incorporation of an alkylene oxide with a polymeric organophosphonite as herein described, the stabilized vinyl resin solutions of this invention uniformly demonstrate a greater resistance to discoloration upon prolonged heating than do stabilized vinyl resin solutions containing only the polymeric organophosphonite as a stabilizer. Further, the stabilization of vinyl resin solutions in accordance with this invention advantageously is not affected to any substantial extent by the conventional presence of minor amounts of water, e.g. up to about 7 weight percent based upon the weight of the organic solvent employed or slightly higher, and is similarly unaffected by the previous exposure of the polymeric organophosphonite to moist air when the latter is in admixture with the alkylene oxide.

In particular, the vinyl resins contemplated by this invention are those of the type prepared by the homopolymerization of acrylonitrile or by the copolymerization thereof with either vinyl chloride, vinylidene chloride or both. The preferred vinyl resins are those copolymers of acrylonitrile with either vinyl chloride and/or vinylidene chloride containing from about 35 to about 85 weight percent of acrylonitrile polymerized therein. It is to be noted in this respect that the term "copolymer," as employed herein, is meant to include terpolymer. Similarly, the term "copolymerization" is meant to define the polymerization of two or more different monomers.

The polymeric organophosphonites contemplated by this invention are, as hereinabove described, produced by the reaction of a saturated aliphatic polyol with a dihydrocarbyl phenylphosphonite. During the course of reaction, an alkyl alcohol and/or a phenol of the formula ROH, wherein R is as defined above, is also produced depending upon the particular dihydrocarbyl phenylphosphonite utilized as a reactant. Hence, the reaction temperature employed in the production of the polymeric organophosphonites is ordinarily and preferably sufficiently high so as to facilitate the liberation and removal of the alcohol ROH formed during the course of the reaction. In this manner, optimum product yields can ultimately be realized.

The actual structure of the polymeric organophosphonites will depend for the most part upon the ratio in which the reactants are employed. Thus, for example, upon the utilization of the dihydrocarbyl phenylphosphonite in a substantial excess over an equimolar proportion with respect to the preferred polyol reactant, i.e., a saturated aliphatic diol, especially in proportions of greater than 2 up to about 4 or more moles of the phosphonite per mole of the diol, the polymeric organophosphonite produced is predominantly the dimer having a structure corresponding to the general formula

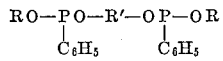

wherein R is as defined above and R' designates a divalent radical residue derived from the diol reactant and which is otherwise identical in structure therewith save for the exclusion of the hydroxyl radicals of the diol. Such a product, it can be seen, is produced by a reaction involving only one of the ester groups, i.e., —OR groups, of each molecule of the phosphonite reactant, and entails the evolution of the corresponding alcohol ROH, wherein R is as defined above. Alternatively, when the reactants are employed in more nearly equimolar proportion, e.g., in a proportion of less than about 2 moles of the phosphonite per mole of the diol, or when the diol is utilized in an excess over an equimolar proportion with respect to the phosphonite, the predominant product that is obtained is the more viscous liquid linear polymer having a structure corresponding to the general formula

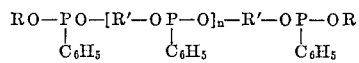

wherein R and R' are as defined above and n is an integer having a value of from 1 to about 8 or even higher. Such a product is produced by the reaction of both ester groups of each molecule of the dihydrocarbyl phenylphosphonite reactant with the exception of the chain-terminating phosphonite molecules, of which only one ester group undergoes reaction. Thus, while polymeric organophosphonites which are useful in accordance with this invention are obtained by employing the reactants in a phosphonite to diol ratio of from about 0.3 mole to about 5 moles of the phosphonite, and preferably from about 0.5 mole to about 2 moles of the phosphonite per mole of the diol, proportions outside this range can also be employed, albeit the efficiency of the reaction may thereby be reduced. The proportion in which the reactants are employed need only be sufficient to produce a polymeric organophosphonite which is soluble in the vinyl resin solutions contemplated by this invention, such proportions being readily ascertainable by one skilled in the art in light of this disclosure. Similar considerations hold true when other polyols are employed as reactants instead of the diols used above for illustrative purposes.

Moreover, it is to be noted that in any given reaction between a dihydrocarbyl phenylphosphonite and, for example, a saturated aliphatic diol, both the dimer and the higher molecular weight polymers described above may be obtained as products, and that each are effective as heat stabilizers for vinyl resin solutions. The dimer and the higher molecular weight polymers can, if desired, be mutually separated subsequent to their production by conventional techniques, such as by the fractional distillation of the crude reaction product or by any other convenient method. However, their mutual separation is in no way essential to their use in accordance with this invention.

The saturated aliphatic polyols which can be reacted with a dihydrocarbyl phosphonite to produced the polymeric organophosphonites contemplated by this invention include the saturated aliphatic diols, particularly the alkylene glycols, such as ethylene glycol, propylene glycol, 1,2-butanediol, 1,4-butanediol, 1,5-pentanediol, 1,8-octanediol, etc. Also included in this regard are the alkylene glycol ethers, e.g., the di-, tri-, and polyoxyalkylene glycols, such as diethylene glycol, triethylene glycol, dipropylene glycol, etc. Suitable polymeric organophosphonites can also be obtained by the reaction of a dihydrocarbyl phosphonite with a saturated aliphatic polyol, and particularly a saturated aliphatic hydrocarbon polyol, containing 3, 4, or more hydroxyl radicals per molecule, such as 1,2,6-hexanetriol, pentaerythritol, etc. The preferred polyol reactants are the diols, such as the alkylene glycols and alkylene glycol ethers, particularly those containing from 4 to 6 carbon atoms. It is also preferred that the hydroxyl radicals of the polyols be separated by at least 4 carbon atoms since the formation of cyclic products upon reaction with a dihydrocarbyl phosphonite is thereby substantially precluded.

As typical of the dihydrocarbyl phenylphosphonites which can be reacted with a saturated aliphatic polyol to produce the polymeric organophosphonites contemplated by this invention, can be mentioned: diethyl phenylphosphonite, di-n-butyl phenylphosphonite, diisobutyl phenylphosphonite, dihexyl phenylphosphonite, di-2-ethylhexyl phenylphosphonite, diisooctyl phenylphosphonite, didodecyl phenylphosphonite, diphenyl phenylphosphonite, etc. Of these, the dialkyl phenylphosphonites possessing alkyl radicals containing from 2 to about 8 carbon atoms are preferred reactants. It is also to be noted that the dihydrocarbyl phenylphosphonite can also contain more than one type of ester grouping. Thus, other suitable dihydrocarbyl phenylphosphonites include butyl phenyl phenylphosphonite, ethyl hexyl phenylphosphonite, etc. Moreover, when a mixed dihydrocarbyl phenylphosphonite is employed as a reactant, the ester grouping of the compound which is the most susceptible to transesterification, and therefore the first to react with the polyol reactant, is the —OR radical corresponding to the lowest boiling alcohol of the formula ROH.

Further, in order to facilitate the removal of the alcohol ROH formed during the course of the reaction, the saturated aliphatic polyol employed as a reactant is ordinarily and preferably one having a boiling point above that of the alcohol. Conversely, it can also be seen that the dihydrocarbyl phenylphosphonite employed as a reactant ordinarily and preferably contains at least one ester, i.e. —OR, grouping corresponding to an alcohol having the formula ROH which is lower boiling than the polyol reactant. In this manner, the removal of the alcohol ROH during the course of the reaction can be effected readily by conducting the reaction at a temperature which is at or above the boiling point of the alcohol while below the boiling point of the polyol reactant, and by distilling off the alcohol as it is formed. Accordingly, by way of illustration, the reaction between diethyl phenylphosphonite and 1,8-octanediol can be conducted at any temperature between 78.4° C. under atmospheric pressure, the boiling point of ethanol, and 180° C. under a reduced pressure of 15 millimeters of mercury, the boiling point of the diol reactant. In addition, an azeotroping agent, such as benzene or toluene, etc. can also be incorporated in the reaction mixture to assist in the removal of alcohol. Moreover, when a lower boiling azetrope is formed between such an agent and the alcohol ROH, the reaction can be conducted at any temperature at which such azeotrope is recoverable as a distillate, notwithstanding the fact that this temperature may be somewhat below the boiling point of the alcohol per se.

Conducted in the manner, the reaction is preferably allowed to proceed to completion as evidenced by a cessation in the evolution and recovery of the alcohol ROH. Shorter reaction periods can also be employed, although generally accompanied by reduced product yields. The crude reaction product is then ordinarily stripped to remove any unreacted material or alcohol, as well as any azeotroping agent present. To this end, good results can be obtained, for example, by stripping the crude reaction product up to about the boiling point of the polyol reactant. The polymeric organophosphonite product thus obtained is thereafter utilizable in accordance with this invention.

The lower alkylene oxides employed in combination with the aforementioned polymeric organophosphonites in the practice of this invention are the 1,2- and 1,3-alkylene oxides containing from 2 to 4 carbon atoms. The use of these lower alkylene oxides in combination with polymeric organophosphonites as herein described permits the realization of improved stability for vinyl resin solutions. Moreover, it has been found that the lower alkylene oxides are generally removed in substantial part from the vinyl resin environment during subsequent procedures such as by extraction in connection with fiber spinning operations and are therefore not present to any substantial extent in the articles produced from the stabilized vinyl resin solutions. The reduced quantity of alkylene oxide in the solid vinyl resin products is desirable since the presence of larger, stabilizing quantities ordinarily may have an unwanted plasticizing effect upon the product. Therefore, the use of higher alkylene oxides, which cannot readily be removed from the vinyl resin environment upon subsequent utilization of the stabilized vinyl resin solutions, is generally to be avoided in accordance with this invention.

Among the suitable alkylene oxides there can be mentioned: ethylene oxide, 1,2-propylene oxide, 1,2-butylene oxide, 1,3-butylene oxide, etc., of which 1,2-propylene oxide is preferred.

Of the organic solvents which can be used to solvate the vinyl resin, particularly good results can be obtained using acetonitrile, acetone, the N,N-dialkylformamides and acetamides, ethylene carbonate and cyclohexanone. However, any other inert organic solvent for the vinyl resin which will not react with the stabilizer employed or with the resin itself can also be used.

The concentration of the polymeric organophosphonite incorporated in the vinyl resin solution in accordance with this invention can vary broadly. Preferably, concentrations of at least one polymeric organophosphonite effecting the presence in the vinyl resin solution of from about 0.01 to about 1 weight percent of phosphorus based upon the weight of the vinyl resin are employed, with especially good results realizable using concentrations effecting the presence of from about 0.05 to about 0.3 weight percent of phosphorus based upon the weight of the resin. Somewhat higher or lower concentrations of the polymeric organophosphonite may also be employed effectively.

The concentration of the lower alkylene oxide employed in combination with the polymeric organophosphonite can also vary broadly, with good results attainable using concentrations of from about 0.2 to about 5 weight percent of at least one alkylene oxide based upon the weight of the vinyl resin. Again, slightly higher or lower concentrations may also be employed effectively. The preferred concentration range in this connection is from about 1 to about 3 weight percent of the alkylene oxide based upon the weight of the vinyl resin.

Upon the addition or incorporation of the stabilizer combination as herein described, the stabilized vinyl resin solutions of this invention can be used in any conventional manner or operation, and evidence improved resistance to discoloration upon heating.

The invention is illustrated further by reference to the following examples of its practice but is not intended to be limited thereby.

*Example I*

In a kettle equipped with a stirrer, thermometer and a packed reflux column, 264 grams of diethyl phenylphosohonite (1.33 moles) and 139 grams of 1,5-pentanediol (1.33 moles) were reacted in initial admixture with 500 cubic centimeters of toluene, at a temperature which was gradually raised to 150° C., while removing the ethanol formed during the course of the reaction as an azeotropic distillate with toluene. The reaction was continued until the evolution of ethanol virtually ceased. Thereafter, the crude reaction product was vacuum-stripped up to a temperature of 170° C., under a reduced pressure of 4 millimeters of mercury. In this manner, 296 grams comprised of a polymeric diethyl phenylphosphonite-1,5-pentanediol reaction product were recovered as a water-white liquid remaining behind in the kettle. Analysis showed the product to have a phosphorus content of 14.36 percent by weight and a viscosity of 9,500 centipoises at a temperature of 25° C. In similar manner, dibutyl phenylphosphonite is reacted with diethylene glycol to produce a polymeric organophosphonite.

*Example II*

Using equipment similar to that described in Example I, 294 grams of diphenyl phenylphosphonite (1 mole) and 125 grams of 1,5-pentanediol (1.2 moles) were reacted at temperature in the range of from about 100° C. to about 162° C., under a reduced pressure of from 8 millimeters to 12 millimeters of mercury, for a period of about two and one-half hours, while removing the phenol produced during the course of the reaction. Upon the end of the reaction period, the system was purged with nitrogen to remove any trace of phenol still present. In this manner, 256 grams comprised of a polymeric diphenyl phenylphosphonite-1,5-pentanediol reaction product were recovered as a light yellow liquid remaining behind in the kettle. Analysis showed the product to have a viscosity of 1880 centipoises at a temperature of 25° C.

*Example III*

In a series of experiments, 150 grams of acetone were introduced to each of two one-pint pressure bottles and cooled by placing the bottles in an acetone-"Dry Ice" bath for about 30 minutes or until the temperature of the acetone reached approximately −20° C. To one bottle, 1 gram of the diphenyl phenylphosphonite-1,5-pentanediol reaction product of Example II was then added after exposure of the reaction product to the atmosphere for a period of about 18 hours. To another bottle, a mixture of 1 gram of the same reaction product and 1 gram of 1,2-propylene oxide was added after exposure of the mixture to the atmosphere for a period of about 18 hours. Thereafter, to each of the bottles there were added 50 grams of a copolymer resin of vinyl chloride (60 percent) and acrylonitrile (40 percent) having a molecular weight such that the specific viscosity of a 0.2 percent solution of the copolymer in cyclohexanone at a temperature of 20° C. was about 0.26. The bottles were placed in a steam bath at a temperature of about 50° C. for a period of about 30 minutes to effect solvation of the resin. Heating was then continued at a temperature of 80° C. for a period of 2 hours, whereby a clear resin solution was obtained containing 25 percent solids and suitable for the spinning of synthetic fibers. Finally, the color of the resin solutions were determined quantitatively by measuring the transmission of light at a wave length of 430 millimicrons through a solution containing 4 percent resin and 12 percent acetone by weight, and prepared by weighing out approximately 5 grams of the resin solution into a two-ounce glass vial and adding thereto a volume of dimethyl formamide which is cubic centimeters was equal to 5.3 times the weight of the resin solution in grams. Calculated in this manner, the light transmission through the resin solution containing the stabilizer of this invention, i.e. the combination of the polymeric diphenyl phenylphosphonite - 1,5 - pentanediol reaction product and 1,2-propylene oxide was 80 percent while the resin solution containing only the diphenyl phenylphosphonite-1,5-pentanediol reaction product showed considerably more color development as evidenced by a light transmission of only 75 percent. In like manner, upon substituting the polymeric diethyl phenylphosphonite1,5-pentanediol reaction product of Example I as the polymeric organophosphonite, the light transmission through the resin solution containing the stabilizer of this invention was about 83 percent, while, again, the resin solution containing only the polymeric organophosphonite showed considerably more color development as evidenced by a light transmission of only 72 percent. The improved effectiveness of the stabilizers of this invention is also evidenced upon prolonged heating of the resin solution. Similarly, the effectiveness of the polymeric dibutyl phenylphosphoniteethylene glycol reaction product of Example I is enhanced by use in admixture with 1,2-propylene oxide.

What is claimed is:

1. A stabilized vinyl resin solution comprising (a) an inert organic solvent solution of a vinyl resin copolymer of acrylonitrile with at least one member selected from the group consisting of vinyl chloride and vinylidene chloride, said vinyl resin copolymer containing from about 35 to about 85 weight percent of acrylonitrile polymerized therein; (b) a polymeric organphosphonite produced by the heating of a saturated aliphatic diol selected from the group consisting of the alkylene glycols and alkylene glycol ethers containing from 2 to 8 carbon atoms with a dihydrocarbyl phenylphosphonite of the formula

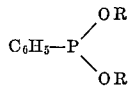

wherein each R, independently, is selected from the group consisting of the alkyl radicals of from 1 to 10 carbon atoms and the phenyl radical, at a temperature of from about the boiling point of the lowest boiling alcohol formed during the course of the reaction to about the boiling point of said saturated aliphatic diol, and in a proportion of from about 0.3 to about 5 moles of said dihydrocarbyl phenylphosphonite per mole of said saturated aliphatic diol, said polymeric organophosphonite effecting the presence in said vinyl resin solution of from about 0.01 to about 1 weight percent of phosphorus based upon the weight of said vinyl resin; and (c) a lower alkylene oxide containing from 2 to 4 carbon atoms, in a concentration of from about 0.2 to about 5 weight percent based upon the weight of said vinyl resin.

2. The stabilized vinyl resin solution according to claim 1 wherein the dihydrocarbyl phenylphosphonite is a dialkyl phenylphosphonite.

3. The stabilized vinyl resin solution according to claim 1 wherein the dihydrocarbyl phenylphosphonite is diethyl phenylphosphonite, the saturated aliphatic diol is 1,5-ene glycol, and the lower alkylene oxide is 1,2-propylene oxide.

4. The stabilized vinyl resin solution according to claim 1 wherein the dihydrocarbyl phenylphosphonite is dibutyl phenylphosphonite, the saturated aliphatic diol is diethylene glycol, and the lower alkylene oxide is 1,2-propylene oxide.

5. The stabilized vinyl resin solution according to claim 1 wherein the dihydrocarbyl phenylphosphonite is diphenyl phenylphosphonite, the saturated aliphatic diol is 1,5-pentanediol, and the lower alkylene oxide is 1,2-propylene oxide.

References Cited by the Examiner
UNITED STATES PATENTS
3,061,583  10/1962  Huhn et al. _____ 260—45.8

LEON J. BERCOVITZ, *Primary Examiner.*